3,405,124
OPTIONALLY 17 - (HYDROCARBON - SUBSTITUTED) - 17 - OXYGENATED - 2,3 - EPITHIO-5α-ANDROSTANES
Paul D. Klimstra, Northbrook, Ill., assignor to G. D. Searle & Co., Chicago, Ill., a corporation of Delaware
No Drawing. Filed Aug. 12, 1963, Ser. No. 301,651
9 Claims. (Cl. 260—239.5)

The present invention relates to thiosteroids of the androstane series and, more particularly, to [optionally 17-(hydrocarbon-substituted)] - 17 - oxygenated - 2,3-epithio-5α-androstanes represented by the structural formulas

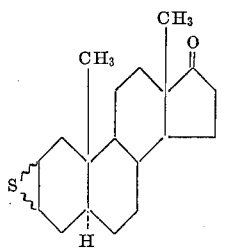

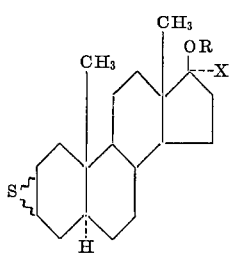

wherein R represents hydrogen or an acryl radical derived from a lower alkanoic acid, X can be hydrogen or a radical selected from the group consisting of lower alkyl, lower alkenyl, and lower alkynyl, and the wavy lines are symbolic of the alternative 2α,3α and 2β,3β stereochemical configurations.

The lower alkanoic acids contemplated as a source of the acyl radicals encompassed by R in the foregoing structural representation are typified by acetic, propionic, butyric, valeric, caproic, heptanoic, and the branched-chain acids isomeric therewith. Examples of the lower alkyl, lower alkenyl, and lower alkynyl radicals symbolized by X are methyl, ethyl, isopropyl, secondary-butyl, tertiary-pentyl, hexyl, heptyl, vinyl, allyl, crotyl, propenyl, butenyl, pentenyl, hexenyl, heptenyl, ethynyl, propynyl, propargyl, butynyl, pentynyl, hexynyl, heptynyl, i.e., those groups containing less than 8 carbon atoms.

The compounds of the present invention are conveniently obtained by cyclization of the novel intermediates represented by the following structural formulas

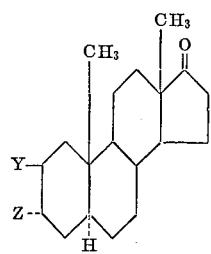

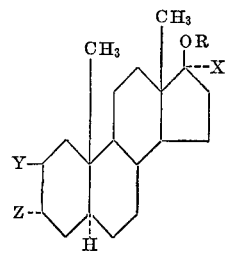

wherein R and X have the same meaning indicated above, and Y and Z are unidentical members selected from the group consisting of hydroxy, (lower alkanoyl)oxy, and thiocyanato, at least one of those radicals being thiocyanato. The lower alkanoyl radicals symbolized by Y and Z are derived from those lower alkanoic acids designated hereinbefore. The transformation of those intermediates to the instant epithio compound is effected by reaction with an inorganic alkaline reagent such as sodium hydroxide, potassium hydroxide, lithium hydroxide, sodium carbonate, or potassium carbonate in a suitable solvent medium at or near room temperature. The instant 2α,3α-epithio derivatives are obtained from the 3α-thiocyanato intermediates, while the 2β-thiocyanato intermediates afford the instant 2β,3β-epithio substances. Typically, 3α-thiocyanato - 5α - androstane-2β,17β-diol is contacted with potassium hydroxide in aqueous methanol at room temperature to afford 2α,3α-epithio-5α-androstan-17β-ol while 17α - methyl-2β-thiocyanato-5α-androstane-3α,17β-diol, in an analogous manner, is converted to 2β,3β-epithio-17α-methyl-5α-androstan-17β-ol. These thiocyanato intermediates are preferably obtained from the corresponding 2,3-epoxy substances by reaction with thiocyanic acid. The aforementioned 17α-methyl-2β-thiocyanato-5α-androstane-3α,17β-diol is produced from 2α,3α-epoxy-17α-methyl-5α-androstan-17β-ol by reaction with an ethereal solution of thiocyanic acid. The 3α-thiocyanato intermediates are derived from the 2β,3β-epoxy starting materials as is exemplified by the reaction of 2β,3β-epoxy-17α-methyl-5α-androstan-17β-ol with thiocyanic acid to afford 17α-methyl - 3α - thiocyanato-5α-androstane-2β,17β-diol.

An alternate route to the instant 17-hydroxy compounds involves reduction of the corresponding 17-keto derivatives. As a specific example, 2β,3β-epithio-5α-androstan-17-one is contacted in a suitable organic solvent such as tetrahydrofuran with a metallic reducing agent such as lithium tri-(tertiary-butoxy) aluminum hydride to afford 2β,3β-epithio-5α-androstan-17β-ol.

The 17-(hydrocarbon-substituted) substances of this invention can be produced also by reaction of the corresponding 17-keto compound with the appropriate organometallic reagent. The particular processes in question are specifically illustrated by reaction of the aforementioned 2α,3α-epithio-5α-androstan-17-one with methyl magnesium bromide or lithium acetylide to yield 2α,3α-epithio-17α - methyl-5α-androstan-17β-ol and 2α,3α-epithio-17α-ethynyl-5α-androstan-17β-ol, respectively.

Catalytic hydrogenation of the instant 17α-alkynyl substances provides an additional method for manufacture of those 17α-alkenyl and 17α-alkyl derivatives wherein the hydrocarbon substituent contains more than one carbon atom. Partial hydrogenation of the instant 2β,3β-epithio-17α-ethynyl-5α-androstan-17β-ol thus provides 2β,3β-epithio-17α-vinyl-5α-androstan-17β-ol while the absorption of two molecular equivalents of hydrogen results in 2β,3β-epithio-17α-ethyl-5α-androstan-17β-ol.

Acylation of the instant 17-hydroxy compounds with a lower alkanoic acid anhydride or halide in the presence of a suitable acid acceptor such as pyridine or triethylamine affords the corresponding 17β-(lower alkanoyl) oxy derivatives. Thus, 2β,3β-epithio-5α-androstan-17β-ol is contacted with acetic anhydride and pyridine at room temperature to produce 2β,3β-epithio-5α-androstan-17β-ol.

The novel compounds of the present invention are useful in view of their valuable pharmacological properties.

They display hormonal and anti-hormonal activity, for example, as is evidenced by their ability to evoke anabolic, androgenic, and anti-estrogenic responses.

The invention will appear more fully from the examples which follow. These examples are set forth by way of illustration only, and it will be understood that the invention is to be construed as limited in spirit or in scope by the details contained therein as many modifications in materials and methods will be apparent from this disclosure to those skilled in the art. In these examples, temperatures are given in degrees centigrade (° C.) and quantities of materials in parts by weight unless otherwise noted.

Example 1

To a cold solution of 60 parts of potassium thiocyanate in 30 parts of water is added first 154 parts of ether, then 90 parts of 85% phosphoric acid in portions of about 18 parts. The mixture is shaken between each addition of phosphoric acid, and the purple ethereal layer is finally separated, washed with water, and dried over anhydrous sodium sulfate. To that ethereal solution is added 5.6 parts of 2β,3β-epoxy-5α-androstan-17β-ol, and the resulting solution is kept at room temperature for about 3½ days. During this reaction period, ether is added in order to maintain solution. After the reaction period is completed, the solution is washed with dilute aqueous sodium carbonate until neutral, then with water. Drying over anhydrous sodium sulfate containing decolorizing carbon followed by distillation of the solvent at reduced pressure affords a solid residue. Recrystallization of that residue from acetone-hexane results in 3α-thiocyanato-5α-androstane-2β,17β-diol, melting at about 210–213°. This substance displays an optical rotation of +37.5° in chloroform.

Example 2

To a solution of 2.9 parts of 17α-methyl-5α-androst-2-en-17β-ol and 0.4 part of anhydrous sodium acetate in 112 parts of chloroform is added dropwise, with stirring and cooling, 4 parts by volume of a 40% peracetic acid in acetic acid solution. The resulting reaction mixture is allowed to stand at room temperature for about 2 hours, then is washed with dilute aqueous potassium hydroxide, dried over anhydrous sodium sulfate, and concentrated to dryness at reduced pressure. Recrystallization of the residue from ethanol affords 2α,3α-epoxy-17α-methyl-5α-androstan-17β-ol, melting at about 205–207° and displaying an optical rotation of +0.5° in chloroform.

To a cold solution of 10 parts of potassium thiocyanate in 6 parts of water is added 28 parts of ether, and this mixture is shaken while 15 parts of 85% phosphoric acid is added in small portions. The purple ether layer is separated and washed with water, then dried over anhydrous sodium sulfate. To that ethereal solution is added one part of 2α,3α-epoxy-17α-methyl-5α-androstan-17β-ol, and the resulting reaction mixture is shaken to effect solution, then is allowed to stand at room temperature for about 70 hours. The slightly purple reaction mixture is washed with 10% aqueous sodium carbonate until the color disappears, then is washed with water. Ethyl acetate is added to dissolve the small amount of precipitate which forms, and that organic solution is dried over anhydrous sodium sulfate, then stripped of solvent by distillation at reduced pressure. The resulting solid residue is recrystallized from acetone to afford 17α-methyl-2β-thiocyanato-5α-androstane-3α,17β-diol, melting at about 207–210° and characterized further by an optical rotation of +35° in chloroform. Infrared absorption maxima are observed at about 2.75, 3.4, 4.62, and 5.82 microns.

Example 3

To a cold solution of 40 parts of potassium thiocyanate in 20 parts of water is added 105 parts of ether, and this mixture is shaken while 60 parts of 85% phosphoric acid is added portionwise. The resulting purple ethereal solution is separated, washed with water, then dried over anhydrous sodium sulfate. To that ethereal thiocyanic acid solution is added 3.7 parts of 2α,3α-epoxy-5α-androstan-17-one, and the resulting reaction mixture is stirred rapidly for about 15 minutes, then is stored at room temperature for about 70 hours. This solution is washed successively with 10% aqueous sodium carbonate and water, then is dried over anhydrous sodium sulfate containing decolorizing carbon. Removal of the solvent by distillation at reduced pressure affords an oil which solidifies on standing. Recrystallization of that solid from ethanol results in pure 3α-hydroxy-2β-thiocyanato-5α-androstan-17-one, melting at about 177–180°. This compound displays an optical rotation of +78° in chloroform.

Example 4

To a solution of 5 parts of 3α-bromo-17α-methyl-5α-androstane-2β,17β-diol in 317 parts of tetrahydrofuran is added a solution of 1.5 parts of sodium carbonate in 103 parts of water. The resulting reaction mixture is stirred at room temperature for about 47 hours, then is poured into a mixture of ice and water. The precipitate which forms is collected by filtration, washed on the filter with water, and dried. Recrystallization of that solid from acetone - hexane affords 2β,3β - epoxy - 17α - methyl - 5α-androstan-17β-ol, melting at about 157–159° and characterized also by an optical rotation of +25° in chloroform.

An ethereal solution of thiocyanic acid is prepared according to the procedure described in Example 2. To that ethereal solution is added one part of 2β,3β-epoxy-17α-methyl-5α-androstan-17β-ol, and this reaction mixture is allowed to stand at room temperature for about 72 hours. Successive washings of that organic solution with 10% aqueous sodium carbonate and water followed by drying over anhydrous sodium sulfate containing decolorizing carbon affords a solution which is stripped of solvent at reduced pressure. The resulting residual solid is recrystallized from acetone-hexane to afford pure 17α-methyl-3α-thiocyanato-5α-androstane-2β,17β-diol, melting at about 183–185°. It displays an optical rotation of +17.5° in chloroform.

Example 5

To a two-phase system consisting of a cold solution of 55 parts of potassium thiocyanate in 37 parts of water and 140 parts of ether is added, portionwise with shaking, 83 parts of 85% phosphoric acid. The ether layer is then separated, washed with water, and dried quickly over anhydrous sodium sulfate. That ethereal solution of thiocyanic acid is then added to a solution of 5 parts of 2β,3β-epoxy-5α-androstan-17-one in 14 parts of ether, and the resulting reaction mixture is stored at room temperature for about 3 days. Washing of this solution first with 10% aqueous sodium carbonate then with water followed by drying over anhydrous sodium sulfate affords an organic solution which is stripped of solvent at reduced pressure. Successive recrystallizations of the residual solid from aqueous methanol results in pure 2β-hydroxy-3α-thiocyanato-5α-androstan-17-one, melting at about 204–206°. This substance possesses an optical rotation of +85.5° in chloroform.

Example 6

By substituting 1.13 parts of 17α-(1-butynyl)-2α,3α-epoxy-5α-androstan-17β-ol and otherwise proceeding according to the processes described in Example 2, 17α-(1-butynyl)-2β-thiocyanato-5α-androstane-3α,17β-diol is obtained.

Example 7

The substitution of 1.08 parts of 2β,3β-epoxy-17α-(1-propynyl)-5α-androstan-17β-ol in the procedure described in Example 4 results in 17α-(1-propynyl)-3α-thiocyanato-5α-androstane-2β,17β-diol.

Example 8

When 1.05 parts of 2β,3β-epoxy-17α-ethyl-5α-androstan-17β-ol is allowed to react with thiocyanic acid according to the procedure of Example 4, 17α-ethyl-3α-thiocyanato-5α-androstane-2β,17β-diol is obtained.

Example 9

By substituting 1.05 parts of 2α,3α-epoxy-17α-ethyl-5α-androstan-17β-ol and otherwise proceeding according to the processes described in Example 2, 17α-ethyl-2β-thiocyanato-5α-androstane-3α,17β-diol is obtained.

Example 10

A mixture of one part of 3α-thiocyanato-5α-androstane-2β,17β-diol and 12 parts of methanol is warmed to effect solution, at which time a solution of 0.5 part of potassium hydroxide in 5 parts of water containing 12 parts of methanol is added. The resulting reaction mixture is allowed to stand at room temperature for about 2 hours, then is diluted with water. The precipitate which forms is collected by filtration, washed on the filter with water, and dried in air to afford 2α,3α-epithio-5α-androstan-17β-ol, melting at about 128–130°. Recrystallization of that material from acetone-hexane affords a pure sample, melting at about 128-129°. It displays an optical rotation of +27° in chloroform and is characterized further by the structural formula

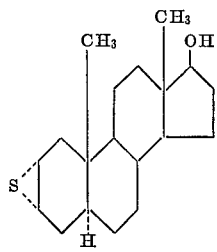

Example 11

A mixture of 2.3 parts of 17α-methyl-2β-thiocyanato-5α-androstane-3α,17β-diol and 64 parts of methanol is heated to the reflux temperature in order to effect solution, then is cooled to room temperature. To that mixture is added a solution of 0.75 part of potassium hydroxide in 2 parts of water containing 16 parts of methanol, and that reaction mixture is kept at room temperature for about 2 hours. Dilution of the reaction mixture with water results in precipitation of a solid which is collected by filtration, washed on the filter with water, and dried in air to produce 2β,3β-epithio-17α-methyl-5α-androstan-17β-ol, melting at about 148–150°. Further purification is effected by recrystallization from hexane, resulting in material melting at about 151–153°. It displays an optical rotation of +12.5° in chloroform and is represented by the structural formula

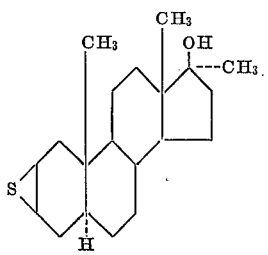

Example 12

To a solution of 5 parts of 3α-hydroxy-2β-thiocyanato-5α-androstan-17-one in 100 parts of methanol, warmed to effect solution, is added a solution of 2.5 parts of potassium hydroxide in 25 parts of water containing 44 parts of methanol. This reaction mixture is allowed to stand at room temperature for about 1¾ hours, at the end of which time it is diluted with about 250 parts of water, then is cooled. The resulting precipitate is collected by filtration and dried in air to afford 2β,3β - epithio - 5α-androstan-17-one, melting at about 146–148°. Recrystallization of that material from aqueous acetone affords the pure substance, melting at about 153–154°. This compound is represented by the structural formula

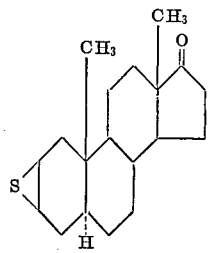

Example 13

To a solution of one part of 2β,3β-epithio-5α-androstan-17-one in 18 parts of tetrahydrofuran is added, with stirring, a solution of 2.5 parts of lithium tri-(tertiary-butoxy) aluminum hydride in 18 parts of tetrahydrofuran at 0–5°, and stirring is continued for about 1½ hours. The reaction mixture is then poured into ice and water containing 15.8 parts of acetic acid, and the precipitate which forms is collected by filtration and dried in air. Recrystallization of that solid from aqueous methanol results in 2β,3β - epithio - 5α - androstan-17β-ol, melting at about 151–153°. It is represented by the structural formula

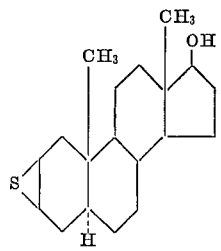

Example 14

To a solution of 1.5 parts of 17α-methyl-3α-thiocyanato-5α-androstane-2β,17β-diol in 32 parts of methanol is added, with warming, a solution of 0.75 part of potassium hydroxide in 7.5 parts of water containing 14 parts of methanol. The resulting reaction mixture is kept at room temperature for about 2 hours, during which time needle-like crystals of the product are formed. These crystals are collected by filtration, and the filtrate is diluted with water causing precipitation of an additional quantity of the product. The combined precipitates are recrystallized from aqueous acetone to yield 2α,3α - epithio-17α-methyl-5α-androstan - 17β-ol, characterized by a melting point at about 173–174°. This compound is further characterized by an optical rotation of +4° in chloroform and also by the structural formula

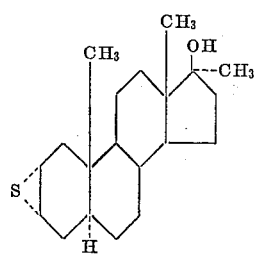

Example 15

*Method A.*—To a solution of 3 parts of the 30% lithium acetylide-70% ethylene diamine complex in 13.5 parts of tetrahydrofuran, under nitrogen, is added with stirring over a period of about 5 minutes, a solution of 1.5 parts of 2β,3β-epithio-5α-androstan-17-one in 13.5 parts of tetrahydrofuran. The reaction mixture is stirred at room temperature for about 2 hours, then is poured into a mixture of ice and water containing 12 parts of concentrated hydrochloric acid. The resulting precipitate is collected by filtration, washed on the filter with water, and dried in air to afford 2β,3β - epithio-17α-ethynyl-5α-androstan-17β-ol. Recrystallization of that solid from aqueous acetone affords the pure material, melting at about 146–148.5°. It displays infrared absorption maxima at about 2.75, 3.1, and 3.42 microns, an optical rotation in chloroform of −22.5°, and is characterized further by the structural formula

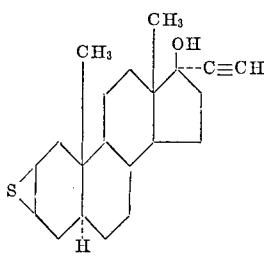

*Method B.*—To a cold solution of 15 parts of potassium thiocyanate in 8.5 parts of water is added 60 parts of ether, then 23 parts of 85% phosphoric acid in portions with intermittent shaking. After the phosphoric acid addition has been completed, the ether layer is separated, washed with water, and dried over anhydrous sodium sulfate. The drying agent is washed with ether, and the ether solutions are combined. To that ethereal solution of thiocyanic acid is added 1.3 parts of 2α,3α-epoxy-17α-ethynyl-5α-androstan-17β-ol, and the resulting solution is stored at room temperature for about 3 days. At the end of that reaction period, the mixture is filtered to remove a small amount of insoluble material, and the filtrate is washed successively with 10% aqueous sodium carbonate and water, then is dried over anhydrous sodium sulfate containing decolorizing carbon and evaporated to dryness at reduced pressure to yield 17α-ethynyl-2β-thiocyanato-5α-androstane-3α,17β-diol as a glass. Infrared absorption maxima are observed at about 2.75, 3.1, 3.4, 4.52, and 9.87 microns.

To a solution of 7 parts of 17α-ethynyl-2β-thiocyanato-5α-androstane-3α,17β-diol in 140 parts of methanol is added a solution of 4 parts of potassium hydroxide in 40 parts of water containing 80 parts of methanol. This reaction mixture is allowed to stand at room temperature for about 2 hours, then is diluted with water and cooled at 0–5° for about 16 hours. This aqueous mixture is diluted further with water and cooled, then is filtered to remove the precipitate which has formed. Recrystallization of that solid from aqueous acetone results in 2β,3β-epithio-17α-ethynyl-5α-androstan-17β-ol, melting at about 146–148°, and identical with the product of Method A.

Example 16

A mixture of one part of 2β-hydroxy-3α-thio-cyanato-5α-androstan-17-one and 28 parts of methanol is heated to effect solution, and a solution of 0.5 part of potassium hydroxide in 10 parts of water containing 12 parts of methanol is then added with cooling. This reaction mixture is allowed to stand at room temperature for about 2 hours, then is diluted by the addition of about 10 parts of water. Cooling of this aqueous mixture at 0–5° results in precipitation of the crude product which is collected by filtration. Recrystallization of that product from aqueous acetone results in 2α,3α-epithio-5α-androstan-17-one, melting at about 106–108°. It displays an optical rotation of +98° in chloroform and is represented by the structural formula

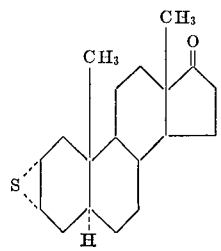

Example 17

To a solution of 3 parts of the 30% lithium acetylide-70% ethylene diamine complex in 45 parts of tetrahydrofuran, in a nitrogen atmosphere, is added with stirring at room temperature a solution of 3 parts of 2α,3α-epithio-5α-androstan-17-one in 45 parts of tetrahydrofuran. This reaction mixture is stirred at room temperature for about 2 hours, then is poured into a mixture of ice and water containing sufficient hydrochloric acid to render the mixture acidic. This acidic mixture containing a gummy precipitate is neutralized by the addition of 5% aqueous sodium bicarbonate, then is allowed to stand at 0–5° for about 2 hours. The gummy precipitate is isolated by decantation and is extracted into ether. The resulting organic solution is dried over anhydrous potassium carbonate containing decolorizing carbon, then is stripped of solvent at reduced pressure to afford crude 2α,3α-epithio-17α-ethynyl-5α-androstan-17β-ol. Two recrystallizations from aqueous acetone result in the pure product, melting at about 169–171°. This substance is characterized by infrared absorption maxima at about 2.75, 3.1, and 3.4 microns and also by the structural formula

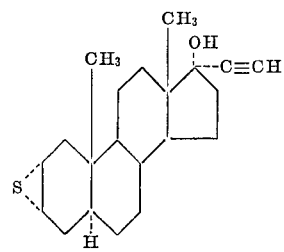

Example 18

A mixture of 2.5 parts of 2β,3β-epithio-5α-androstan-17β-ol, 10 parts of acetic anhydride, and 20 parts of pyridine is allowed to stand at room temperature for about 4 hours, then is poured into a mixture of ice and water. The precipitate which forms is collected by filtration, washed on the filter with water, and dried. Successive recrystallizations from aqueous acetone afford pure 2β,3β-epithio-5α-androstan-17β-ol 17-acetate, melting at about 147–149°. This compound is represented by the structural formula

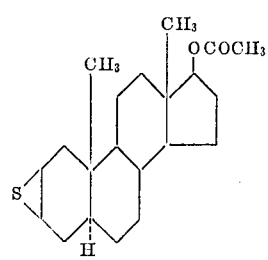

Example 19

When 2.4 parts of 17α-ethyl-2β-thiocyanato-5α-androstane-3α,17β-diol is substituted for 17α-methyl-2β-thiocyanato-5α-androstane-3α,17β-diol in the procedure of Example 11, 2β,3β-epithio-17α-ethyl-5α-androstan-17β-ol is obtained. This compound can be represented by the structural formula

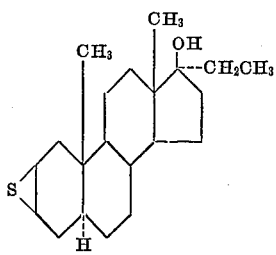

Example 20

By substituting 1.56 parts of 17α-ethyl-3α-thiocyanato-5α-androstane-2β,17β-diol and otherwise proceeding according to the processes described in Example 14, 2α,3α-epithio-17α-ethyl-5α-androstan-17β-ol is obtained. This compound is represented by the structural formula

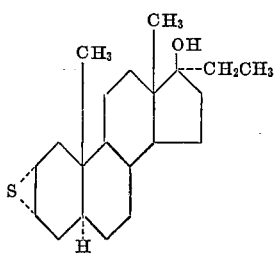

Example 21

The cyclization of 7.5 parts of 17α-(1-butynyl)-2β-thiocyanato-5α-androstane-3α,17β-diol according to the procedure described in Method B of Example 15 results in 2β,3β-epithio-17α-(1-butynyl)-5α-androstan-17β-ol of the structural formula

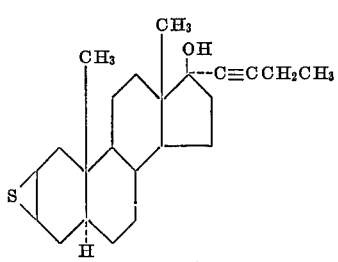

Example 22

By substituting 1.6 parts of 17α-(1-propynyl)-3-thiocyanato-5α-androstane-2β,17β-diol and otherwise proceeding according to the process described in Example 14, 2α,3α-epithio - 17α - (1-propynyl)-5α-androstan-17β-ol of the structural formula

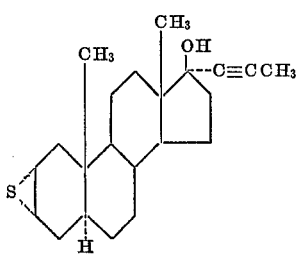

is obtained.

Example 23

The reaction of 2.5 parts of 2α,3α-epithio-5α-androstan-17β-ol with 12.7 parts of propionic anhydride and 20 parts of pyridine according to the procedure described in Example 18 results in 2α,3α-epithio-5α-androstan-17β-ol 17-propionate, represented by the structural formula

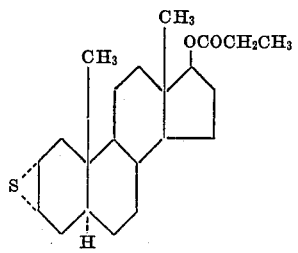

Example 24

A mixture of one part of 17α-ethynyl-2β-thiocyanato-5α-androstane-3α,17β-diol, 10 parts of acetic anhydride and 20 parts of pyridine is heated at the reflux temperature is poured into water, and the resulting aqueous mixroom temperature for about 16 hours. This reaction mixture is poured into water, adn the resulting aqueous mixture is extracted with ether. The ether extract is washed successively with water, dilute aqueous sodium bicarbonate, dilute hydrochloric acid, and dilute aqueous sodium bicarbonate, then is dried over anhydrous potassium carbonate containing decolorizing carbon and stripped of solvent by distillation at reduced pressure. Recrystallization of the resulting solid from aqueous methanol affords 17α - ethynyl - 2β - thiocyanato-5α-androstane-3α-17β-diol 3,17-diacetate.

The substitution of 8.6 parts of 17α-ethynyl-2β-thiocyanato-5α-androstane - 3α,17β - diol 3,17-diacetate for 17α - ethynyl-2β-thiocyanato-5α-androstane-3α,17β-diol in Method B of Example 15 results in 2β,3β-epithio-17α-ethynyl-5α-androstan-17β-ol 17-acetate of the structural formula

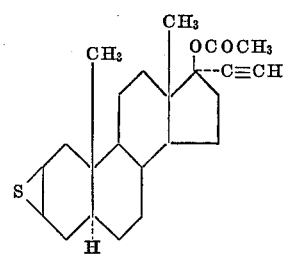

Example 25

The acetylation of one part of 17α-methyl-3α-thiocyanato-5α-androstane-2β,17β-diol according to the procedure described in Example 24 results in 17α-methyl-3α-thiocyanato-5α-androstane-2β,17β-diol 2,17-diacetate.

By substituting 1.8 parts of 17α-methyl-3α-thiocyanato-5α-androstane-2β,17β-diol 2,17-diacetate and otherwise proceeding according to the processes described in Example 14, 2α,3α-epithio-17α-methyl-5α-androstan-17β-ol 17-acetate of the structural formula

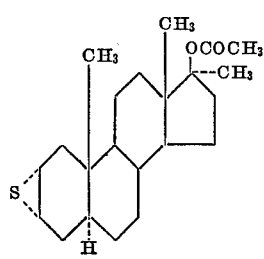

is obtained.

What is claimed is:
1. A compound represented by the formula

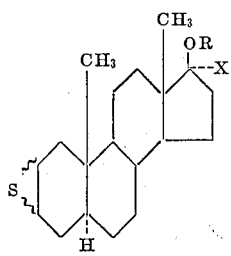

wherein R is selected from the group consisting of hydrogen and radicals of the formula

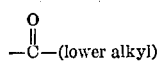

and X is a radical selected from the group consisting of lower alkyl, lower alkenyl and lower alkynyl.

2. A compound of the formula

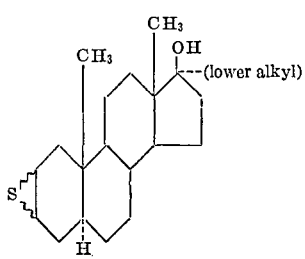

3. 2β,3β-epithio-17α-methyl-5α-androstan-17β-ol.
4. 2α,3α-epithio-17α-methyl-5α-androstan-17β-ol.

5. A compound of the formula

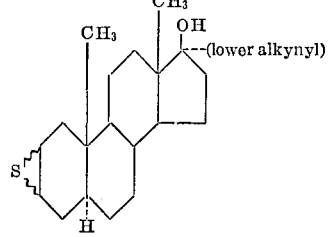

6. 2β,3β-epithio-17α-ethynyl-5α-androstan-17β-ol.
7. 2α,3α-epithio-17α-ethynyl-5α-androstan-17β-ol.
8. A 2,3-epithio steroid of the formula

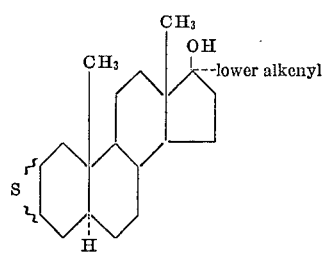

wherein the ripple mark (⌇) is a generic indication of α- and β-configurations.

9. 2β,3β-epithio-17α-vinyl-5α-androstan-17β-ol.

References Cited

UNITED STATES PATENTS

| | | | |
|---|---|---|---|
| 3,102,897 | 9/1963 | Ringold | 260—397.4 |
| 3,105,831 | 10/1963 | Romeno | 260—239.5 |
| 3,230,215 | 1/1966 | Romeno | 260—239.5 |

OTHER REFERENCES

Takeda et al.: "Chemistry and Industry," No. 41, Oct. 13, 1962, pp. 1793–1794.

LEWIS GOTTS, *Primary Examiner.*

J. R. BROWN, *Assistant Examiner.*